March 22, 1955  R. M. HELLER  2,704,835
LIGHT BULB SOCKET MOUNTING
Filed June 14, 1951
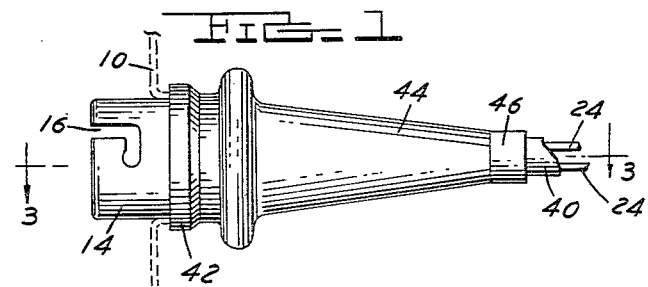
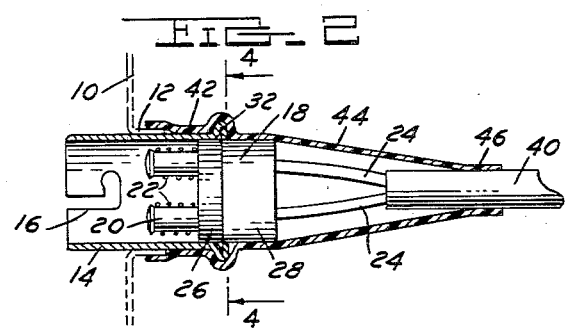
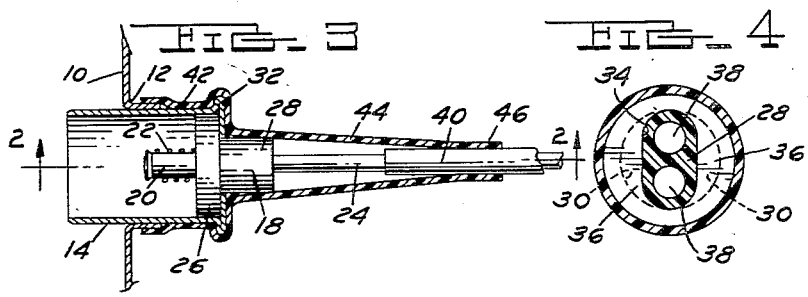
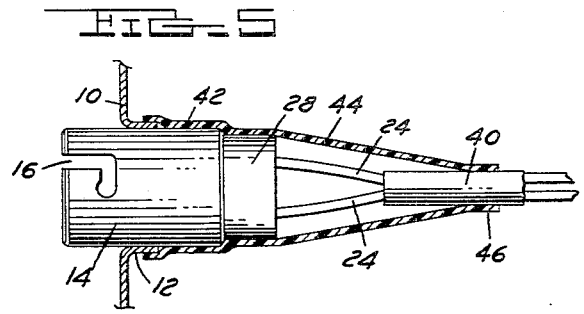
INVENTOR.
ROBERT M. HELLER
BY
Burton & Parker
ATTORNEYS

United States Patent Office 2,704,835
Patented Mar. 22, 1955

2,704,835

LIGHT BULB SOCKET MOUNTING

Robert M. Heller, Birmingham, Mich.

Application June 14, 1951, Serial No. 231,605

6 Claims. (Cl. 339—188)

This invention relates to sockets and particularly to improvements in light bulb sockets and the mounting thereof upon supporting members.

An important object of the invention is to provide an improved socket for electric light bulbs which is designed and constructed in a novel manner for economical manufacture and for rapid and convenient installation in supporting panels and the like and which is protected in a novel manner by a coating or sheath constituting an integral and functional part of the socket assembly. Another important object of the invention is to provide a socket assembly composed of parts including a socket tube and an insulating body carrying one or more light bulb engaging terminals, the tube and body being arranged for interfitting engagement to hold one another from relative rotation. A further important object of the invention is to provide an improved light bulb socket assembly including a plastic sheath which covers the exterior surface of the assembly and is arranged at one end to form a dust and liquid type seal with the supporting member in which the assembly is mounted and arranged at the other end to form a functional extension of the assembly to protect portions which would otherwise be exposed to contact by foreign matter.

Various other objects, advantages and meritorious features of the invention will become more fully apparent from the following specification, appended claims and accompanying drawings, wherein:

Fig. 1 is a side elevation of the improved socket assembly showing the insulation thereof and a supporting panel of a motor vehicle;

Fig. 2 is a longitudinal cross sectional view through the socket assembly of Fig. 1 and showing the same installed on a supporting panel;

Fig. 3 is a longitudinal sectional view through the socket assembly but turned 90° to the sectional view shown in Fig. 2;

Fig. 4 is a transverse cross sectional view taken along line 4—4 of Fig. 2; and

Fig. 5 is a side view, partly in section, illustrating a modification of the invention.

The socket construction illustrated herein, although particularly adapted for use in motor vehicles, may be readily employed in other circumstances. As illustrated herein, the socket assembly is designed for mounting on motor vehicle instrument panels and in housings of vehicle tail light constructions.

There is shown a flat plate-like supporting member 10 which may be a conventional instrument panel disposed in front of the driver of a motor vehicle or the back wall of a motor vehicle tail light assembly. The panel is initially shaped under dies to provide an opening for receiving the socket and a relatively short circular flange portion 12 projecting outwardly from the panel and surrounding the opening. The flange 12 is shown as integrally connected to the panel.

The socket assembly comprises a circularly shaped metallic tube or sleeve portion 14 opened at its opposite ends. In final assembled position in a supporting structure such as the panel 10, the tube is slidingly fitted in the flange with its end sections projecting from opposite sides of the panel. The inner bulb receiving end of the sleeve portion is provided with means for releasably attaching a light bulb such as the provision of a pair of opposed bayonet slots 16. For such form of attachment the base end of the light bulb is provided with lateral projections which enter the slots and are interlocked therewith upon partial rotation of the bulb. The light bulb side of the panel represents the front or interior side of the panel and is usually protected from contact with foreign matter such as dust, dirt, liquid, et cetera. The opposite side of the panel represents the rear or exterior side of the panel and is usually exposed to dirt, dust, liquid and other deteriorating agents.

Received in the outer end section of the socket tube 14 is a body or core generally indicated at 18 which is composed of resilient material such as rubber and carries either one or two electrical contacts for engagement with the base of the lamp bulb, there being two such contacts in the illustrated embodiment of the invention. The contacts are similarly constructed and may each compose a hollow member 20 mounted in the body 18 for depressible movement. A coiled spring 22 encircles each contact member and is seated at its outer end against the head of the member and at its opposite end on the body and yieldingly urges the member to its most extended position as shown. Associated with each contact member is an electrical conductive element in the form of a flexible insulatively covered wire 24 which enters the opposite end of the body 18 and is connected to the base end of each contact member in the interior of the body.

An important feature of the invention is the construction and assembled relation of the socket tube 14 and the body 18 to one another and the provision of a sheath of plastic material which serves not only to protect the exterior portions of the socket but also as an integral and functional part of the socket. The body 18 is composed of insulative material such as rubber and is molded into a particular configuration for interlocking engagement with the socket tube 14 and such that each is held against rotation relative to the other. For this purpose, the body 18, although molded in one piece, is shaped into two sections of different exterior formations. As shown in Figs. 2 and 3 and by comparing them with one another, the body 18 is provided with a circular portion 26 slidably fitting and lying wholly within the socket tube and a non-circular portion 28 of a general ovate formation extending through the outer end of the socket tube. The cross sectional formation of the latter portion of the body is shown in Fig. 4. The result is that the circular portion 26 forms a pair of shoulders on opposite sides of the narrow dimension of the ovate portion as indicated in dotted outline at 30—30 in Fig. 4.

In both forms of the invention illustrated herein, the outer end of the socket tube 14 is provided with a partial closing end wall having an opening therethrough of the same cross sectional dimension as the ovate portion 28 of the body 18. In one form of the invention the socket tube 14 is shaped under dies to provide a peripheral ridge 32 extending around the outer end of the tube. As shown in Figs. 2 and 3, this is accomplished under dies by bending the outer end of the tube's wall first outwardly completely around the axis of the tube and then bending or folding the balance of the end of the tube inwardly upon itself and radially toward the axis of the tube. The inwardly bent portion forms an end wall for the socket tube. This wall is provided with an elongated opening 34 therethrough of the same cross sectional dimensions as the ovate portion 28 of the core. The opening 34 divides the end wall into two diametrically opposed segments 36—36 between which the ovate portion of the body 18 extends. The two end wall segments 36—36 function as supporting shelves upon which the shoulders 30—30 of the circular portion of the body 18 seat. The ovate portion of the body 18 is provided with either one or two longitudinally extending holes 38 through which the wires 24 are led.

The wires 24—24 lead from the ovate portion 28 of the body 18 and are connected to a source of current. For a part of their length after the wires leave the body they are preferably covered with a thin layer of insulation. At a point spaced from the body the wires enter a heavy thick insulating body 40 of the cylindrical formation shown which protects the wires for the balance of their lengths and particularly through relatively exposed areas of the motor vehicle or other structure in which the wires are mounted. The thick body of insulation 40 encloses both wires where two are used and is relatively stiff and hard to bend. For that short distance between the terminating end of the insulation 40 and the body 18, the wires 24 have a greater degree of flexibility enabling these portions of the wire to be readily bent, if need be, around structural portions of the motor vehicle before entering the socket assembly. The greater degree of flexibility of the wires adjacent to the socket assembly reduces the strains imposed thereon by the bending of the wires or for other reasons and enables the springs 22 to project the contacts 20—20 their maximum distance in the socket tube. Otherwise, such strains are likely to cause one or both wires to eventually retract the contact member associated therewith either out of engagement with the base end of the lamp in the socket or in light contact therewith. When this occurs the lamp will be extinguished or will flicker on and off depending on how far the contact member is spaced from the base end of the lamp.

To protect these relatively exposed flexible portions of the lead wires 24—24 as well as to serve as a protective coating and seal for the exterior parts of the socket assembly, there is provided a sheath of plastic material, such as a vinyl chloride composition, which hugs the outer end of the socket assembly and extends therefrom over the flexible portions of the wires 24—24 to the heavy insulating body 40. The forward or socket covering portion of the plastic sheath is indicated at 42. The mid-portion 44 of the plastic sheath surrounds the relatively lightly insulated flexible sections of the wires 24 and in spaced relation thereto as shown in Figs. 2 and 3. The opposite or rear end 46 of the plastic sheath closely hugs the heavy wire insulation 40 closely beyond its terminal point. Between the socket assembly and the heavy insulation, the mid-portion 44 of the plastic sheath taperingly reduces in cross section but without contacting the wires 24 in order to provide clearance for the latter to flex or bend.

The plastic sheath is formed on the socket assembly by a dipping operation. In this operation, the socket tube 14, togther with the body 18 and a removable tapering arbor forming an extension to the body, is dipped into a plastic solution heated to the degree that it is flowable. The socket tube 14 is not completely immersed in the plastic solution but the outer end thereof with the body 18 therein is lowered into the solution to a level such that approximately half of the tube is immersed while the remaining upper half forming the lamp bulb receiving end is exposed above the surface level of the solution. Thereafter, the socket assembly including the arbor extension is lifted out of the plastic solution carrying therewith a plastic coating of the formation shown in the drawing. The coated assembly is heat treated to cure the plastic material and then cooled so that a tough resilient plastic sheath is formed. The result is the plastic sheath closely surrounds the outer end of the tube 14 to the distance shown in various figures of the drawing. At this level the forward end portion 42 of the plastic sheath is capable of overlapping the circular flange 12 of the supporting member or panel in which the socket is installed and to form a seal for the joint between the flange and socket tube. The plastic coating is capable of being peeled back to allow the flange to extend thereunder and upon return to its forming position the resilient character of the plastic coating overlying the flange will cause it to hug the flange in a liquid and dust tight manner.

The peripheral ridge 32 of the socket tube 14 serves to interlock the plastic sheath on the assembly. It also facilitates handling at the time of the installation of the socket. Moreover, as shown in Fig. 3, the plastic sheath follows the exterior contour of the body 18, closely hugging the end wall segments 36—36 of the socket tube and the ovate portion 28 of the body 18. This provides shoulders on either side of the ovate portion against which a tool may be brought to force the socket tube into the opening of the supporting member or panel 10. It has been found that in the use of such a tool, its direct engagement with the plastic sheath will not damage or otherwise impair the plastic material.

Fig. 5 illustrates a modification wherein all the parts are the same as previously described except that the peripheral ridge 32 has been omitted from the socket tube. The same reference characters employed in the description of the previous embodiment of the invention are applied to the parts of the modification.

What I claim is:

1. Light bulb mounting structure comprising a generally tubular shell having an open front end for receiving a light bulb and a wall at its rear end providing an inwardly extending forwardly facing shoulder having an opening therethrough, a core in said shell including a rearwardly facing abutment surface engaging said shoulder and a laterally reduced rearward extension extending through the opening in said wall, said core having a forwardly facing bulb contact within said shell, an electrical conductor connected to said contact and extending rearwardly from said laterally reduced extension, said conductor having a relatively heavy protective covering extending to a point spaced rearwardly from the rear end of said extension, a sheath of resilient plastic material having an enlarged forward end conforming closely in hugging relation to the side and rear surfaces of said shell and to the side surface of the laterally reduced extension of said core, the rear end of said sheath conforming closely in hugging relation to a portion of the protective covering of said conductor, the intermediate portion of said sheath being spaced laterally from the portion of said conductor intermediate the rear of said core and the portion engaged by the rear end of said sheath.

2. Structure as defined in claim 1 in which the forward end of said sheath is permanently secured to said shell.

3. Structure as defined in claim 2 in which said sheath is formed of a vinyl chloride plastic.

4. Light bulb mounting structure comprising a generally tubular shell having an open front end for receiving a light bulb and a wall at its rear end providing an inwardly extending forwardly facing shoulder having an opening therethrough, a core in said shell including a rearwardly facing abutment surface engaging said shoulder and a laterally reduced rearward extension extending through the opening in said wall, said core having a forwardly facing bulb contact within said shell, an electrical conductor connected to said contact and extending rearwardly from said laterally reduced extension, a sheath of resilient material having an enlarged forward end conforming closely in hugging relation to the side and rear surfaces of said shell and to the side surface of the laterally reduced extension of said core, the rear end of said sheath conforming closely in hugging relation to a portion of said conductor, the intermediate portion of said sheath being spaced laterally from the portion of said conductor intermediate the rear of said core and the portion engaged by the rear end of said sheath.

5. Structure as defined in claim 4 in which said sheath includes a tubular forward edge portion adapted to overlie a rearwardly extending tubular flange surrounding an opening in a mounting panel in which the mounting structure is received, said tubular forward edge portion being free for displacement outwardly and rearwardly from the surface of said tubular shell.

6. Structure as defined in claim 4, in which said shell has at its rear end a generally radially outwardly extending flange and in which said sheath conforms in hugging relation to both front and rear surfaces of said flange.

References Cited in the file of this patent

UNITED STATES PATENTS

| Number | Name | Date |
|---|---|---|
| 1,282,468 | Scheel | Oct. 22, 1918 |
| 1,487,937 | Griffin | Mar. 25, 1924 |
| 2,047,094 | Bennett | July 7, 1936 |
| 2,281,186 | Wade | Apr. 28, 1942 |
| 2,386,000 | McQuiston | Oct. 2, 1945 |
| 2,567,727 | Quackenbush | Sept. 11, 1951 |